(12) United States Patent
Bonomi

(10) Patent No.: US 10,295,387 B2
(45) Date of Patent: May 21, 2019

(54) INTEGRATED BALL VALVE AND ULTRASONIC FLOWMETER

(71) Applicant: Vittorio Bonomi, Fort Lauderdale, FL (US)

(72) Inventor: Vittorio Bonomi, Fort Lauderdale, FL (US)

(*) Notice: Subject to any disclaimer, the term of this patent is extended or adjusted under 35 U.S.C. 154(b) by 213 days.

(21) Appl. No.: 15/496,078

(22) Filed: Apr. 25, 2017

(65) Prior Publication Data

US 2018/0306617 A1    Oct. 25, 2018

(51) Int. Cl.
| | |
|---|---|
| *G01F 1/66* | (2006.01) |
| *F16K 37/00* | (2006.01) |
| *F16K 5/06* | (2006.01) |
| *F16K 27/06* | (2006.01) |
| *G01F 15/00* | (2006.01) |
| *G01F 15/02* | (2006.01) |

(52) U.S. Cl.
CPC ............. *G01F 1/662* (2013.01); *F16K 5/06* (2013.01); *F16K 27/067* (2013.01); *F16K 37/005* (2013.01); *G01F 1/667* (2013.01); *G01F 15/005* (2013.01); *G01F 15/024* (2013.01)

(58) Field of Classification Search
None
See application file for complete search history.

(56) References Cited

U.S. PATENT DOCUMENTS

| | | | |
|---|---|---|---|
| 1,906,266 A | 5/1933 | Hoffman | |
| 3,210,042 A | 10/1965 | Freeman | |
| 3,788,140 A * | 1/1974 | Turtle | G01F 1/00 73/861.28 |
| 4,610,167 A * | 9/1986 | McShane | G01P 5/245 73/861.28 |
| 4,838,093 A * | 6/1989 | Corser | G01F 1/22 73/861.53 |

(Continued)

FOREIGN PATENT DOCUMENTS

| | | |
|---|---|---|
| EP | 2369305 | 9/1987 |
| EP | 0671578 | 3/1999 |

(Continued)

OTHER PUBLICATIONS

Mirshab, "Ultrsonic Sensing for Water Flow Meters and Heat Meters," Texas Instruments Incorporated, Application Report, SNIA020, Apr. 2015, 14 pages.

*Primary Examiner* — Harshad R Patel
(74) *Attorney, Agent, or Firm* — Allen, Dyer, Doppelt + Gilchrist, P.A.

(57) ABSTRACT

A fluid-flow measuring ball valve includes a housing and a ball having an orifice. The ball is moved between an open position allowing fluid flow through the orifice and a closed position preventing fluid flow. A first ultrasonic transducer is positioned in the housing upstream of the ball. A second ultrasonic transducer is positioned in the housing downstream of the ball and both are aligned to send and receive pulses. First and second acoustic reflectors are aligned with the transducers to transmit and reflect ultrasonic signals in at least one direction through the ball orifice when the ball is in an open position. The controller determines the fluid velocity based on measured speed of sound and calculates the volume of fluid through the orifice based on the measured fluid velocity and cross-sectional area.

30 Claims, 10 Drawing Sheets

(56) References Cited

U.S. PATENT DOCUMENTS

| | | |
|---|---|---|
| 5,554,805 A | 9/1996 | Bahrton |
| 5,568,825 A | 10/1996 | Faulk |
| 5,576,486 A | 11/1996 | Paz |
| 6,691,724 B2 | 2/2004 | Ford |
| 6,854,338 B2 * | 2/2005 | Khuri-Yakub ...... B01F 11/0258 73/861.27 |
| 6,874,371 B1 | 4/2005 | Smith et al. |
| 6,923,074 B2 | 8/2005 | Cipolla et al. |
| 8,356,522 B2 | 1/2013 | Allen |
| 2005/0210999 A1 * | 9/2005 | Sylvia .................... G01F 1/662 73/861.29 |
| 2005/0229716 A1 * | 10/2005 | Unsworth ................. G01F 1/66 73/861.53 |
| 2010/0258204 A1 | 10/2010 | Cipolla |
| 2011/0238333 A1 | 9/2011 | Miyata et al. |
| 2011/0271769 A1 * | 11/2011 | Kippersund .............. G01F 1/42 73/861.28 |
| 2011/0281378 A1 * | 11/2011 | Doehler ................. G01F 1/667 73/861.27 |
| 2015/0088321 A1 * | 3/2015 | Schmidt ................. G05B 13/02 700/282 |
| 2015/0211905 A1 | 7/2015 | Drachmann |
| 2015/0277447 A1 * | 10/2015 | Schmidt ............. F16K 37/0091 137/10 |
| 2016/0195418 A1 | 7/2016 | Drachmann et al. |
| 2016/0335875 A1 | 11/2016 | Alcorn et al. |
| 2017/0152648 A1 * | 6/2017 | Hammond ............. G01F 1/667 |
| 2017/0298597 A1 * | 10/2017 | Hammond ............. G01F 1/667 |

FOREIGN PATENT DOCUMENTS

| | | |
|---|---|---|
| EP | 2450675 | 5/2012 |
| JP | 2004101319 | 4/2004 |
| KR | 20-2017-0000903 | 3/2017 |

* cited by examiner

INTEGRATED BALL VALVE AND ULTRASONIC FLOWMETER

FIELD OF THE INVENTION

The present invention relates to the field of ball valves, and more particularly, this invention relates to a ball valve that incorporates a flowmeter.

BACKGROUND OF THE INVENTION

Throughout the world, potable water and gas distribution systems use different types of pipes, valves, and fittings. Most systems, even with their variations, typically include a water or gas flowmeter connected into the system, for example, at a residence or other premises. The flowmeter measures the fluid flow over time, which is then used to bill the premises owner its use of water and/or gas consumed at the premises. There are many different types of pipes, valves, and fittings that may be incorporated in a water or gas distribution system, and different water or gas metering technologies may be used to measure the consumption of water and/or gas depending on the system. Each different type of water or gas distribution system has its own pros and cons and the choice made for any particular flowmeter at a premises is often based on the flowmeter price, flow accuracy, manufacturing process, installation ease, maintenance requirements, and size of its components, relative pipe sizes and placement.

Usually a gas or water distribution system at a premises includes a dedicated fluid flow metering device, which typically operates in conjunction with a manually operated shut-off valve that is located before or upstream of the fluid flow metering device in order to allow a technician to shut off fluid flow and maintain and/or replace the fluid flow metering device when necessary. There are many different examples of gas and water mains that incorporate a shut-off valve adjacent a fluid flow metering device. Usually, a household premises includes either a ball valve or a gate valve in the main gas or water line. Sometimes a yoke box holds a shut-off valve and/or water or gas flowmeter and may incorporate an optional, electronic meter reading iron lid that is removed to access the shut-off valve and/or flowmeter. A domestic water distribution system supply water to appliances such as toilets, faucets, water heaters, and similar devices, and a natural gas distribution system may include a gas main having a shut-off valve and gas flowmeter adjacent or on the house and the gas main connected that branch out into smaller pipe to supply gas appliances such as a grill, lights, pool heater, or similar components. There are problems associated with these more conventional gas and water distribution systems such as size constraints for various valves and fluid flowmeters, unacceptable flowmeter accuracy, and pressure drops that occur in the gas or water distribution system that affect accurate fluid flow metering.

Commonly assigned U.S. Pat. No. 6,923,074 discloses a ball valve with a flow-rate gauge incorporated directly into the ball valve. The ball portion of the ball valve includes a calibrated borehole or orifice and two positionable pressure ports placed before and after the ball respectively, to provide measurements indicative of the flow-rate of the fluid that passes through the ball valve. This ball valve is usually limited to water use. Although it is effective to measure fluid flow at typically higher water flow rates, it has some reduced accuracy at lower water flow rates.

In the past six years, the gas and water metering industry has improved the affordability, performance, and accuracy of ultrasonic flowmeters that use transit time measurements or Doppler Effect measurements. These ultrasonic flowmeters measure the amount of time required for an ultrasonic signal, e.g., an emitted "ping" to pass between two or more fixed points inside the flowmeter. When the ultrasonic flowmeters are calibrated properly for gas and water, they can be used to measure both fluid media. Ultrasonic flowmeters typically incorporate one or more ultrasonic transducers to emit ultrasonic sound waves through the fluid to determine the velocity of the fluid. Because the cross-sectional area of the flowmeter body is a fixed and a known value, when the velocity of the fluid is detected, the volume of fluid passing through the flowmeter may be calculated to a very high accuracy. Also, because fluid density changes with temperature, most ultrasonic flowmeters measure the fluid temperature as a component of the volume calculation and determine fluid flow based on temperature as a variable. When used with ball valves, the ultrasonic flowmeters are connected directly to an existing ball valve or connected into the gas or water pipe to which the ball valve is connected. This may increase the ball valve and its closely connected ultrasonic flowmeter footprint, i.e., make the combination too large for a workable solution, making the flowmeters and valves difficult to install, maintain, and replace.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

A fluid-flow measuring ball valve comprises a housing having inlet and outlet openings and a valve chamber. A ball with an orifice for fluid flow therethrough is contained within the valve chamber and the ball has a calibrated reflector that help the "ping" of the transducer to bounce correctly for the ultrasonic flow meter to measure the water or gas in compliance with the most severe international standards. An actuator is supported by the housing and connected to the ball for turning the ball within the housing between an open position allowing fluid flow through the orifice and a closed position preventing fluid flow. A first ultrasonic transducer is positioned in the housing upstream of the ball. A second ultrasonic transducer is positioned in the housing downstream of the ball. First and second acoustic reflectors are positioned within the housing. A controller, preferably integrated into the actuator, is connected to the first and second ultrasonic transducers.

The first and second ultrasonic transducers and first and second acoustic reflectors are aligned to transmit and reflect ultrasonic signals in at least one direction through the orifice of the ball, and in one example, with a calibrated reflector from one transducer to another transducer when the ball is an open position. The controller is configured to determine the fluid velocity based on measured speed of sound and calculate the volume of fluid passing through the orifice based on the measured fluid velocity and cross-sectional area of the orifice.

In yet another example, the actuator includes a spindle connected to the ball valve and a temperature sensor carried by the spindle may be connected to the controller and configured to measure the fluid temperature. Temperature sensing may aid in accounting for fluid density changes based on temperature and determine the volume of fluid. Each of the first and second acoustic reflectors may comprise an upstream and downstream vertical support mounted within the housing and having an acoustic reflector surface configured to reflect acoustic signals either into an acoustic transducer or into an acoustic reflector surface depending on the transmitted direction of the ultrasonic signals. The first and second acoustic reflectors may each comprise a machined surface integrated within an inner surface of the housing that is calibrated to reflect ultrasonic signals into an acoustic transducer or acoustic reflector surface depending on the transmitted direction of the ultrasonic signals. A third acoustic reflector surface may reflect ultrasonic signals and provide multiple reflections.

In yet another example, first and second ultrasonic transducers each may comprise transmitter and receiver circuits configured to transmit and receive ultrasonic signals. The controller may be integrated within the actuator and connected to said drive mechanism and may be configured to determine fluid velocity based on time-of-flight or the Doppler effect. The measured volume of fluid in an example includes the measured volume of a liquid or gas. The actuator may comprise a drive mechanism and the controller may be configured to actuate the drive mechanism to turn the ball among an open, closed or intermediate position. The controller may include a memory having a water usage signature configured for each appliance in a premises having a water system to which the fluid-flow measuring ball valve is attached and configured to measure the consumption of water inside the premises.

In yet another example, a fluid-flow measuring ball valve comprises a housing comprising a valve body and an end adapter connected together and configured to form an inlet opening and an outlet opening and a valve chamber. A replaceable ball having an orifice is contained within the valve chamber. An actuator is supported by the valve body and connected to the ball for turning the ball within the housing between an open position allowing fluid flow through the orifice and a closed position preventing fluid flow. A first ultrasonic transducer is positioned in the housing upstream of the ball. A second ultrasonic transducer is positioned in the housing downstream of the ball. First and second acoustic reflectors are positioned within the housing and a controller is connected to the first and second ultrasonic transducers.

The first and second ultrasonic transducers and first and second acoustic reflectors are aligned to transmit and receive ultrasonic signals in at least one direction through the orifice of the ball when the ball is in an open position. The controller is configured to determine the fluid velocity based on measured speed of sound and calculate the volume of fluid passing through the orifice based on the measured fluid velocity and cross-sectional area of the orifice.

In yet another example, the body and end adapter each include flanges and through holes that receive fasteners and align the first and second ultrasonic transducers and first and second acoustic reflectors. The body and end adapter may each include gauged threads for assembly among them for securing the end adapter onto the body and alignment marks on the body and end adapter that when aligned indicate the ultrasonic transducers and acoustic reflectors are aligned.

In yet another example, a water flow control system for a premises includes a water system and a plurality of appliances connected into the water system. A fluid-flow measuring ball valve is connected into the water system and comprises a housing having inlet and outlet openings and a valve chamber. A ball has an orifice and is contained within the valve chamber. An actuator is supported by the housing and connected to the ball for turning the ball within the housing between an open position allowing fluid flow through the orifice and a closed position preventing fluid flow. A first ultrasonic transducer is positioned in the housing upstream of the ball. A second ultrasonic transducer is positioned in the housing downstream of the ball.

A controller is connected to the first and second ultrasonic transducers, and the first and second ultrasonic transducers are aligned to transmit and receive ultrasonic signals in at least one direction through the orifice of the ball when the ball is in an open position. The controller is configured to determine the fluid velocity based on measured speed of sound and calculate the volume of fluid passing through the orifice based on the measured fluid velocity and cross-sectional area of the orifice. The controller includes a memory having a water usage signature configured for each appliance in the premises and configured to measure the consumption of water inside the premises. A graphical user interface is connected to the controller for displaying status and inputting data of the water system and specific appliances.

In another example, the first and second transducers may align to each other and transmit and receive ultrasonic pulses without using a reflector.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

Figure 1:
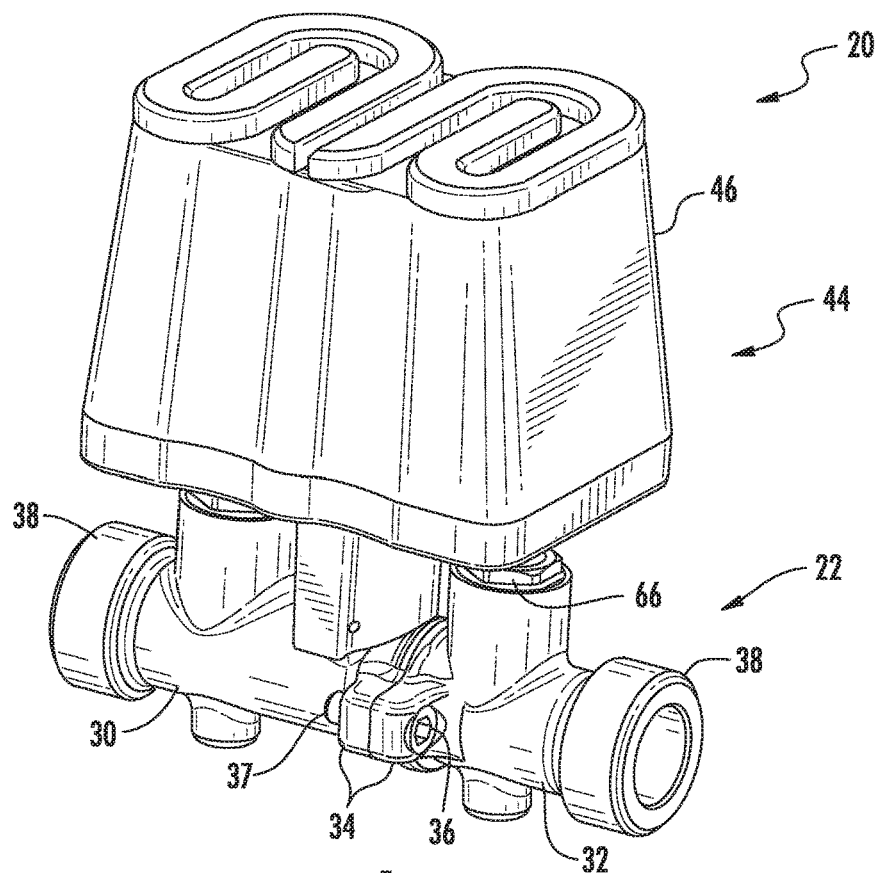
FIG. 1 is an isometric view of the fluid-flow measuring ball valve in accordance with a non-limiting example.
Figure 2:
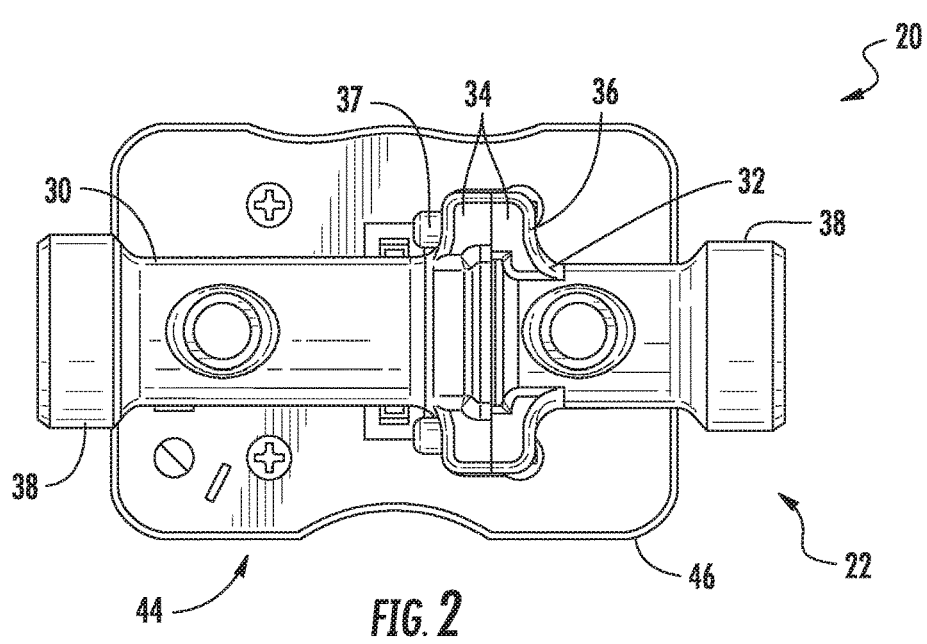
FIG. 2 is a bottom plan view of the fluid-flow measuring ball valve taken in the direction of arrow 1 in FIG. 1 in accordance with a non-limiting example.
Figure 3:
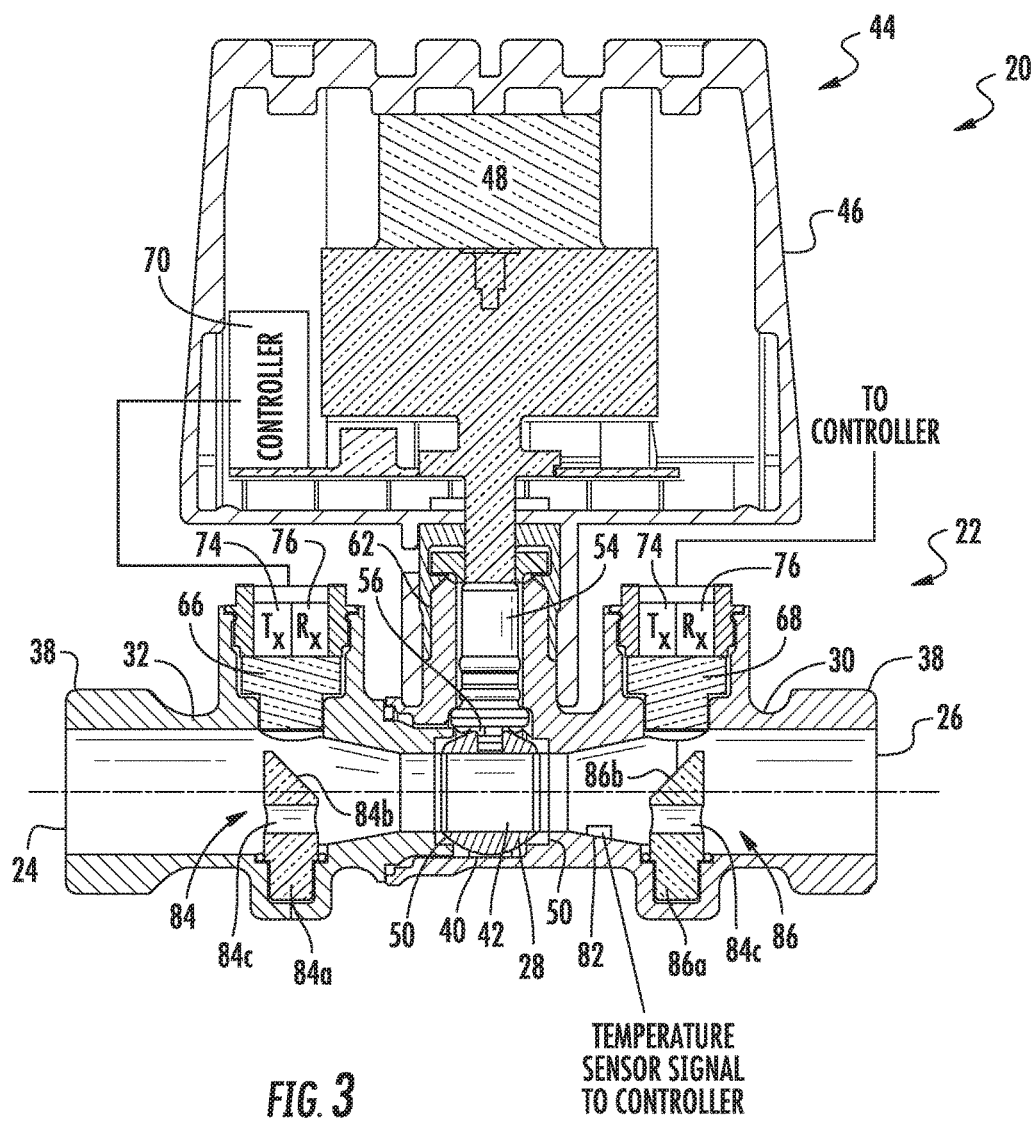
FIG. 3 is a side sectional view showing details of the fluid-flow measuring ball valve in accordance with a non-limiting example.

Referring now to FIGS. 1-4, there is illustrated a first embodiment of the fluid-flow measuring ball valve indicated generally at 20 that includes a housing indicated generally at 22 having an inlet opening 24 and outlet opening 26, and as shown in the schematic sectional view at FIG. 3, a valve chamber 28 formed within the housing 22. This fluid-flow measuring ball valve 20 will also be termed ball valve or ball valve having an integrated flowmeter or integrated ultrasonic flowmeter, and all phrases refer to the fluid-flow measuring ball valve 20. In this example, the housing 22 is formed from two components secured together, in this example, as a valve body 30 that forms the majority of the valve chamber 28 and an end adapter 32 that connects to the valve body 30. When connected together, the two components 30, 32 form the housing 22 and the inlet opening 24 and the outlet opening 26 and the valve chamber 28. The valve body 30 and end adapter 32 in this example each include extensions or flanges 34 having through holes 36 (FIGS. 1, 2 and 4) that align with each other to receive fasteners 37, which as explained below, ensure alignment of the different ultrasonic flowmeter components that are integrated into the fluid-flow measuring ball valve 20. If the valve body 30 and end adapter 32 are screwed together as explained in greater detail below, alignment marks may be used to align various components of the flowmeter components.

The ball valve 20 may include a configuration where the housing 22 has opposing outer ends that are flanged 38 to permit a technician to insert and remove the ball valve from a system of pipes (not shown) and repair or replace when necessary the ball or other components of the integrated flowmeter as to be described. The ball 40 is positioned in the valve chamber 28 and may be formed as a replaceable ball. It includes an orifice or borehole 42 that provides a fluid flow path through the ball, which is parallel to the axis of the ball valve 20. In one example, the orifice 42 may be constructed to obtain a flow constriction that is calibrated to the passage of fluid that runs through the ball valve 20. Also, the cross-sectional area will be known as explained below so that the volume of water can be calculated using the flowmeter that is integrated with the ball valve 20. The water valve 20 may be available in a variety of cross-sections, but common configurations include 1.25, 1.0 and 0.75 inch configurations.

As illustrated, an actuator 44 is supported by the housing 22 and connected to the ball 40 for turning the ball within the housing 22 between an open position allowing fluid flow through the orifice 42 and a closed position preventing fluid flow. This actuator 44 could be manual or automatic, and may have a housing 46 that permits a tool to be connected or a handle to leverage rotating the ball 40 within the housing 22, especially on larger ball valves 20 where the ball rotation may be difficult because of larger water pressures and cross-sectional area. An automatic drive assembly 48 could be connected to the actuator 44 to permit automatic actuation of the ball valve 20 and turning of the ball 40 within the ball valve 20. An automatic drive assembly 48 could include a gear box, an electric motor, and associated components contained in the housing 46 and an integrated controller 70 as explained in greater detail below. In another example, the actuator 44 includes a spindle 45 with temperature sensor function as explained later with reference to FIGS. 7-12.

In this example, ball gaskets 50 (FIG. 3) help support the ball 40 within the housing 22 and engage the end adapter 32 at a pair of ball gasket recesses and the valve body 30 at another pair of ball gasket recesses. The actuator 44 includes a stem 54 having a distal end that connects into a groove or notch 56 of the ball 40 to allow the ball to be rotated within the valve chamber 28 upon rotation of stem 54 via the actuator 44. The stem 54 rides on thrust washers in this example and includes an O-ring that helps receive and guide the stem within a vertical bore 62 formed in the housing 22, and more particularly, the valve body 30 so that the distal end can connect accurately into the notch 56 of the ball 40.

As illustrated in the sectional view of FIG. 3, the ball orifice 42 and proximal portions upstream and downstream of the ball at the end adapter 32 and valve body 30 are configured as a straight channel having the same diameter as the orifice 42 of the ball, but taper outward away from the ball in both the valve body 30 and end adapter 32 to form end portions and a flow channel having the same diameter on both ends of the housing 22. This configuration establishes the same cross-sectional area for the ball orifice 42 and its immediate area both upstream and downstream, and the inlet and outlet openings 24,26, which have a slightly larger diameter than the orifice.

As illustrated in the first embodiment of FIGS. 1-4, a first ultrasonic transducer 66 is positioned in the housing 22 upstream of the ball 40 and a second ultrasonic transducer 68 is positioned in the housing downstream of the ball. In the example as illustrated, the ultrasonic transducers 66,68 are connected to a respective controller 70 that is integral with the actuator 44 and could be connected to the drive assembly or mechanism 48 of the actuator 44. In this example depending on the design for the direction of fluid flow, the first ultrasonic transducer is positioned on the end adapter 32 and the other transducer 68, e.g., the second, is positioned on the valve body 30. Both the end adapter 32 and valve body 30 may include transducer ports that receive the ultrasonic transducers 66,68. In an example, each ultrasonic transducer 66,68 may include a piezoelectric element as is known to those skilled in the art to generate the ultrasonic pulses. In this example, each ultrasonic transducer 66,68 can be pressed or screwed into the respective transducer port by techniques known to those skilled in the art.

This type of ultrasonic transducer includes a transmitter circuit 74 that includes a piezoelectric element in an example and an ultrasonic sensor as a receiver circuit 76. Those circuits 74,76 are configured to transmit and receive ultrasonic signals. Some ultrasonic flowmeters may use one, two or more ultrasonic transducers that emit the ultrasonic pulses as soundwaves, and include other sensors to receive the pulses, but not transmit. Other systems may use ultrasonic transducers that include transmitter and receiver circuits 74,76 for both sensing and transmitting of ultrasonic signals and may use time-of-flight measurements or Doppler effect measurements in a non-limiting example.

Figure 4:
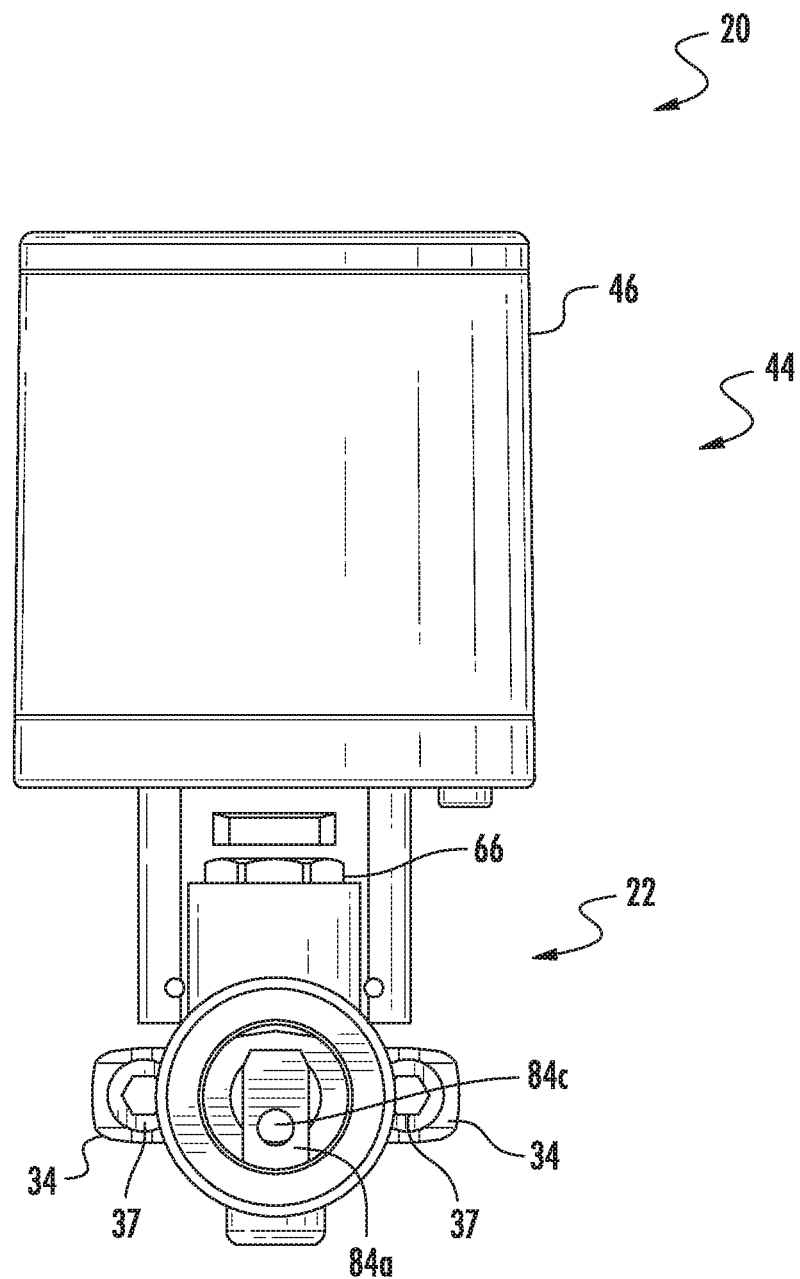
FIG. 4 is an end sectional view taken along line 4-4 of FIG. 3 and showing an acoustic reflector in accordance with a non-limiting example.

In this example, first and second acoustic reflectors 84,86 are positioned within the housing 22. In this example, the first and second ultrasonic transducers 66,68 and first and second acoustic reflectors 84,86 are aligned to transmit and reflect ultrasonic signals in at least one direction through the orifice 42 of the ball 40 when the ball is in the open position. The controller 70 is configured to determine the fluid velocity based on the measured speed of sound and calculate the volume of fluid passing through the orifice based on the measured fluid velocity and the cross-sectional area of the orifice 42 and overall fluid channel. A temperature sensor 82 is connected to the controller 70 and configured to measure the fluid temperature and account for fluid density changes based on temperature and determined the volume of the fluid. Fluid temperature may then be taken into consideration when determining the volume of fluid passing through the orifice. In this first embodiment, first and second acoustic reflectors 84,86 that are positioned within the housing 22 each include a vertical support 84a,86a mounted opposite a respective acoustic transducer 66,68 as shown in FIGS. 3 and 4. Each vertical support 84a,86a includes an acoustic reflector surface 84b,86b to reflect acoustic signals at substantially 90° either into the respective acoustic transducer positioned on the same downstream or upstream side or into another acoustic reflector surface depending on the transmitted direction of the ultrasonic signals.

As best shown in FIG. 4, each vertical support 84a,86a includes a bored through hole 84c,86c to allow fluid to pass through each vertical support and offer less resistance to fluid flow since the vertical support extends upward into the fluid channel formed by the vale body 30 and end adapter 32. The acoustic reflector surfaces 84b,86b in this example are a 45° planar surface relative to the longitudinal axis of the flow channel formed within the housing 22 and receives the ultrasonic signals and reflect them at substantially about 90° into the other acoustic reflector, or if receiving an ultrasonic signal, reflect it substantially about 90° into the ultrasonic transducer on the same downstream or upstream side. The vertical supports 84a,86a may be secured by press fit or threaded into a port formed in the respective housing 22 opposite the respective acoustic transducer.

Figure 5:
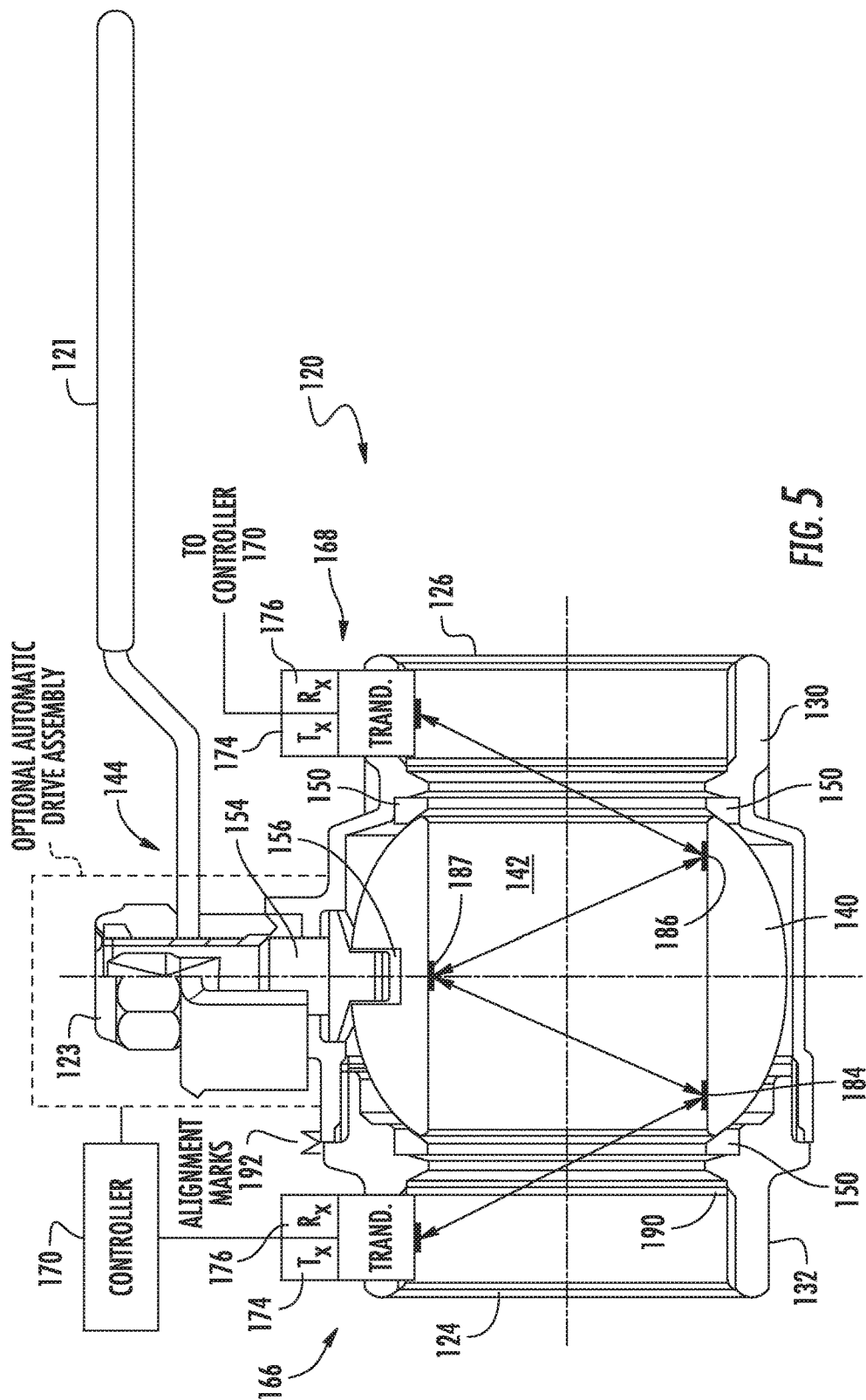
FIG. 5 is a sectional view of another embodiment of the fluid-flow measuring ball valve using machined acoustic reflectors in accordance with a non-limiting example.

A second embodiment of the integrated ball valve and ultrasonic flowmeter 120 is shown in FIG. 5. For purposes of description, common components that may differ in details but have common functionality begin in the 100 series of numerals. This embodiment employs a longitudinal handle 121 secured by a nut 123 in this example. It also includes an end adapter 132 and valve body 130, but with a different configuration than that shown in the first embodiment of FIGS. 1-4. More particularly, the valve body 130 and end adapter 132 are shorter and form a more compact ball valve and integrated ultrasonic flowmeter 120. The ball valve 120 includes the first and second ultrasonic transducers 166,168 and transmitter circuits 174 and receiver circuits 176. The transducers 166,168 are positioned closer to the ball 140 in this example. What is different in this embodiment is the first and second acoustic reflectors 184,186 each are formed as a machined surface that is integrated on an inner surface of the ball 140, and in this particular example, on the inner surface within the ball orifice 142 and aligned with the ultrasonic transducers 166,168 to reflect ultrasonic signals into a respective acoustic transducer or another acoustic reflector depending on the transmitted direction of the ultrasonic signals.

In the second embodiment shown in FIG. 5, the orifice inner surface includes the first and second acoustic reflectors 184,186 as the machined surfaces and a third acoustic reflector 187 as a machined surface that is aligned with first and second acoustic reflectors 184,186 to reflect ultrasonic signals and provide multiple reflections, in this example, four traverses or reflections. In this example, the machined surfaces are formed on the inner surface of the orifice 142, but could be formed on the inner surface of the valve body 130 or end adapter 132 in a non-limiting example and as shown and later explained with reference to FIGS. 9-12. The ultrasonic transducer would be configured and adjusted to direct pulses in a direction to the acoustic reflectors, and thus, alignment becomes more critical and the alignment is made via precise threads and alignment marks as explained below. Different machines may be used to machine the housing and other members such as the machined reflectors, including a transfer machine, CNC machine, single or multi-spindle machines. Different materials may be used for different components, but typically the valve body 130 and end adapter 132 are made from nickel-plated forged ball. The actuator 144 and stem 154 could be formed from a machined brass bar. This construction may apply to all embodiments of FIGS. 1-6.

Because alignment of the transducers and any reflectors should be precise, it may be difficult to guarantee that the ultrasonic transducers 166,168 and acoustic reflectors 184, 186,187 are in axis or alignment to send and receive the ultrasonic pulse signals with the acoustic reflectors, and for this reason, the valve body 130 and the end adapter 132 use gauged threads 190 to secure the two components together and ensure alignment among the transducers and reflectors. The use of nuts and bolts with the flanges 34 and through holes 36 is shown in FIGS. 1-4 may ensure alignment, but in this particular example of FIG. 5, the alignment of the transducers and reflectors can be made by use of the gauged threads 190 and alignment marks 192 on the end adapter 132 and valve body 130 to ensure alignment. Different machines as noted above can be used in the manufacture of the components and threads, but in one example, the automated machine with the CNC control can do the specific number of thread turns necessary to have the ball valve 120 with its valve body 130 and end adapter 132 screwed together and secured and in alignment when the alignment marks 192. Thus, both transducers would be in alignment with any reflectors. The accurate assembly can be tested also by lining up the alignment markings 192 along the valve body 130 and end adapter 132 and testing when no fluid flows.

Figure 6:
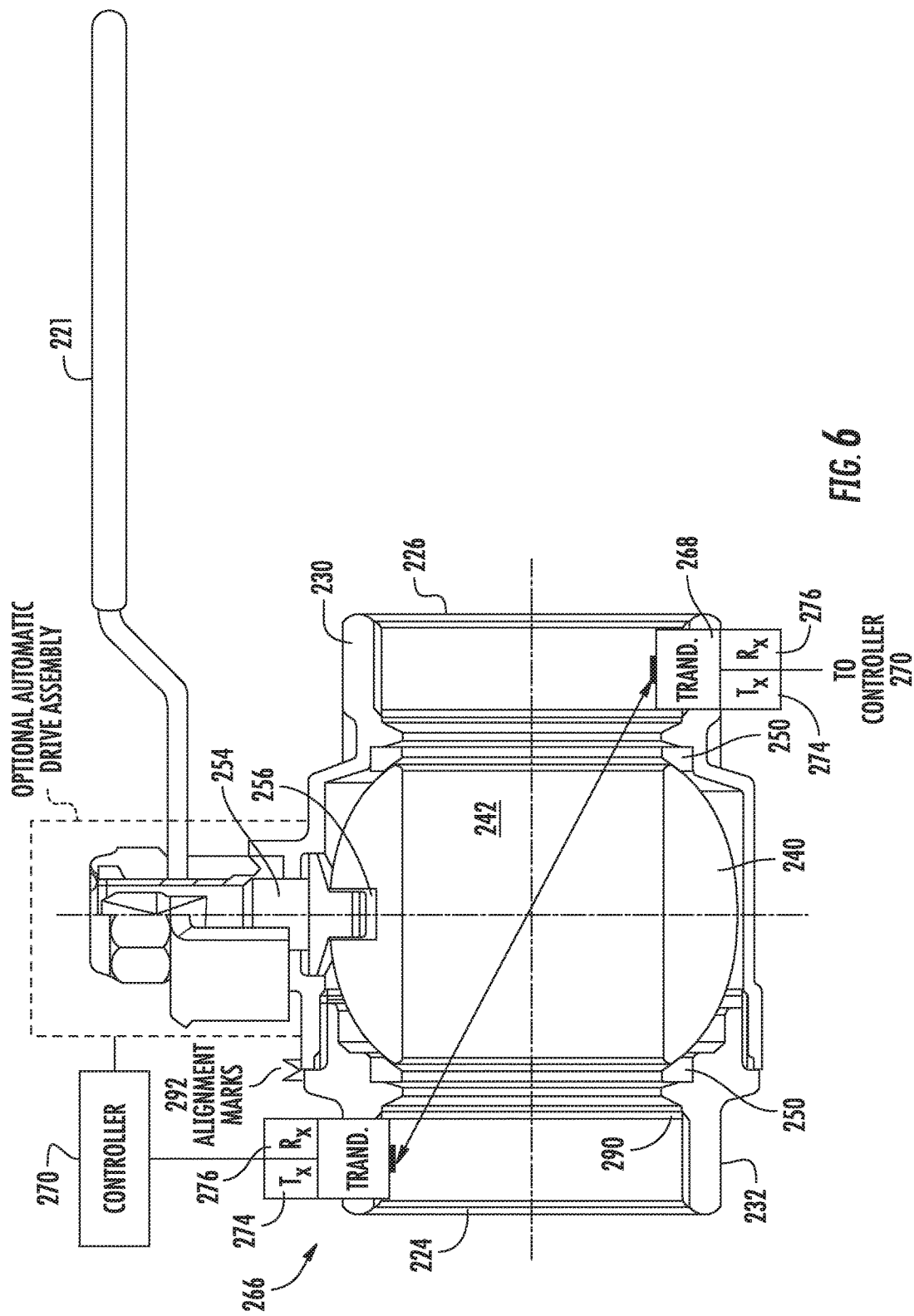
FIG. 6 is a sectional view of yet another embodiment of the fluid-flow measuring ball valve without acoustic reflectors in accordance with a non-limiting example.
Figure 7:
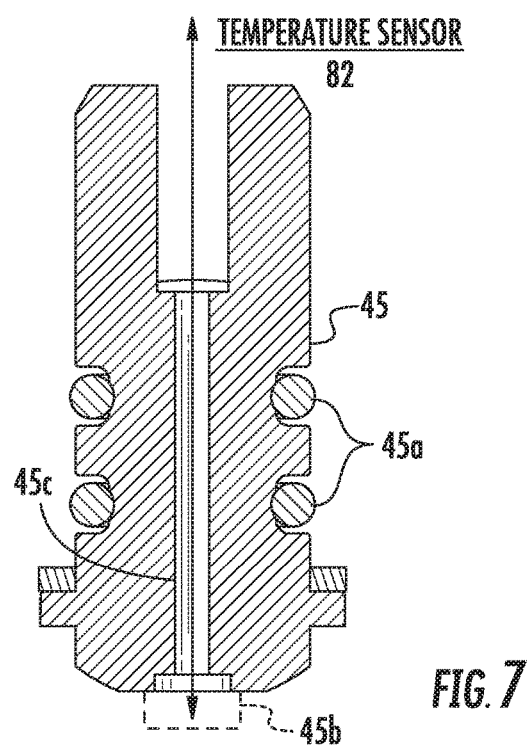
FIG. 7 is a sectional view of the fluid-flow measuring ball valve that includes a spindle as part of the actuator that allows temperature sensing of the fluid in accordance with a non-limiting example.

In the third embodiment shown in FIG. 6, which has reference numerals in the 200 series, the first and second ultrasonic transducers 266,268 are aligned with each other without the use of acoustic reflectors so that one transducer will emit pulses that point to the other transducer. Alignment is ensured by the proper gauge thread measurement of the screw 290 with the specific number of turns and the use of the alignment marks 292 along the valve body 230 and end adapter 232 so that when aligned, the two ultrasonic transducers 266,268 will be in direct alignment with each other.

Referring again to the embodiment shown in FIG. 5, it is possible to generate a number of ultrasonic pulse that traverse the valve 120 via the machined acoustic reflectors, which are designed and configured to be two, three or four traverses, with four traverses shown in the embodiment of FIG. 5. For example, the orifice 142 has an inner surface as described before and yet another machined surface integrated on the inner surface and forming the third acoustic reflector 187 that is aligned with first and second acoustic reflectors 184,186. Although these machined surfaces are shown in the orifice, they could be machined at other positions inside the housing 122 on the valve body 130 or end adapter 132. The ball 140 would be precisely aligned such as precise alignment using the ball gasket 150 and connection via the notch 156. If any reflectors are machined on the inner surface of the ball 140, then alignment of the ball via the notch 156 and alignment of the valve body 130 and end adapter 132 becomes more essential.

In operation, the ball valve 20 having the ultrasonic flowmeter using the ultrasonic transducers 66,68 and any acoustic reflectors 84,86 may average the speed of sound over multiple paths, but typically works by generating the "ping" with the transducers and measures the time elapsed before the other transducer (or sensor) receives the sonic pulse. The ultrasonic paths may point upstream in an example so that the sum of the times of flight of the sonic pulses can be divided by the sum of the flight links and provide an average speed of the sound in the upstream direction.

The ball valve 20 having the integrated ultrasonic flowmeter as explained may also use Doppler effect measurements to determine the velocity of water passing through the valve, or in another example, the transit time that measures the amount of time required for an ultrasonic signal to pass between two or more fixed points inside the ball valve 20. When using the Doppler effect, on the other hand, the frequency of a reflected wave is different due to the Doppler effect. When the fluid moves faster, the frequency shift increases linearly and the controller 70 processes signals from the transmitted wave and its reflections to determine the flow rate. When using a transit time system, the transducers will send and receive ultrasonic waves between the transducers in both upstream and downstream directions. At no flow conditions, it is the same time to travel upstream and downstream between the transducers 66,68, but under flowing conditions, the upstream pulse will travel slower and take more time than the faster downstream pulse. As fluid moves faster, the difference between the upstream and downstream pulse times increases and the controller 70 will process the upstream and downstream pulse times to determine the flow rate.

The path between first and second transducers 66,68 via the first and second acoustic reflectors 84,86 as shown in FIGS. 1-4, for example, is a single path and forms a single path sensor, but the ball valve with its integrated ultrasonic flowmeter 20 could be designed for multiple paths. Usually as the first pulse is generated from an ultrasonic transducer 66, a start signal may be generated at the controller 70 to mark the beginning of a "time-of-flight" measurement. At the second ultrasonic transducer 68, the pulse is received and the controller 70 generates a stop signal to mark the time the ultrasonic pulse was received. The time taken for the pulses to travel from one transducer to the next, i.e., the time between the start and first stop pulse, is the time-of-flight. When a pulse signal is received at the other transducer either by reflection as in FIGS. 1-5 or by direct pulse generation to the other transducer as in FIG. 6, that receiving transducer may switch to transmitting a set of ultrasonic pulses that are received by the other transducer via reflection or direct and form a new time-of-flight. The difference between the two time-of-flights is proportional to the velocity of the flow of the median, fluid or gas in the valve. There may be a calibration factor depending on the type of machining and ball valve configuration. This calibration can be accomplished early before it is connected to flow fluid. The average velocity of the fluid flow is taken into consideration and the cross-sectional area of the orifice and other portions of the ball valve are taken into consideration.

It is also possible that the ball valve and integrated ultrasonic flowmeter 20 may be formed as a non-intrusive Doppler flowmeter that requires particulates or bubbles in the flow such as used in waste water applications or dirty liquid that is conductive or water-based. The frequency shift or Doppler effect may use a physical sound wave that changes frequency when it is reflected by moving discontinuities in the flowing liquid and the discontinuities reflect the ultrasonic pulses with a slightly different frequency that is proportional to the rate of flow of the liquid. In one example, the fluid should contain at least 100 parts per million (ppm) of 100 micron or larger suspended particles or bubbles. One ultrasonic transducer that has both the transmitter circuit and reflector circuit could be used by two ultrasonic transducers.

As noted before, the spindle 45 may be part of the actuator 44. The spindle 45 may include O-rings 45a that allow the spindle to rotate within the housing 22. A protrusion 45b at the distal end of the spindle 45 connects into a notch of the ball 40 so that when the spindle is rotated, the ball also rotates. The spindle 45 may include a temperature sensor 82 that extends through the spindle that permits temperature sensing. It could include a channel that permits fluid flow up the channel to allow temperature sensing closer to the actuator and integrated controller 70.

Figure 8:
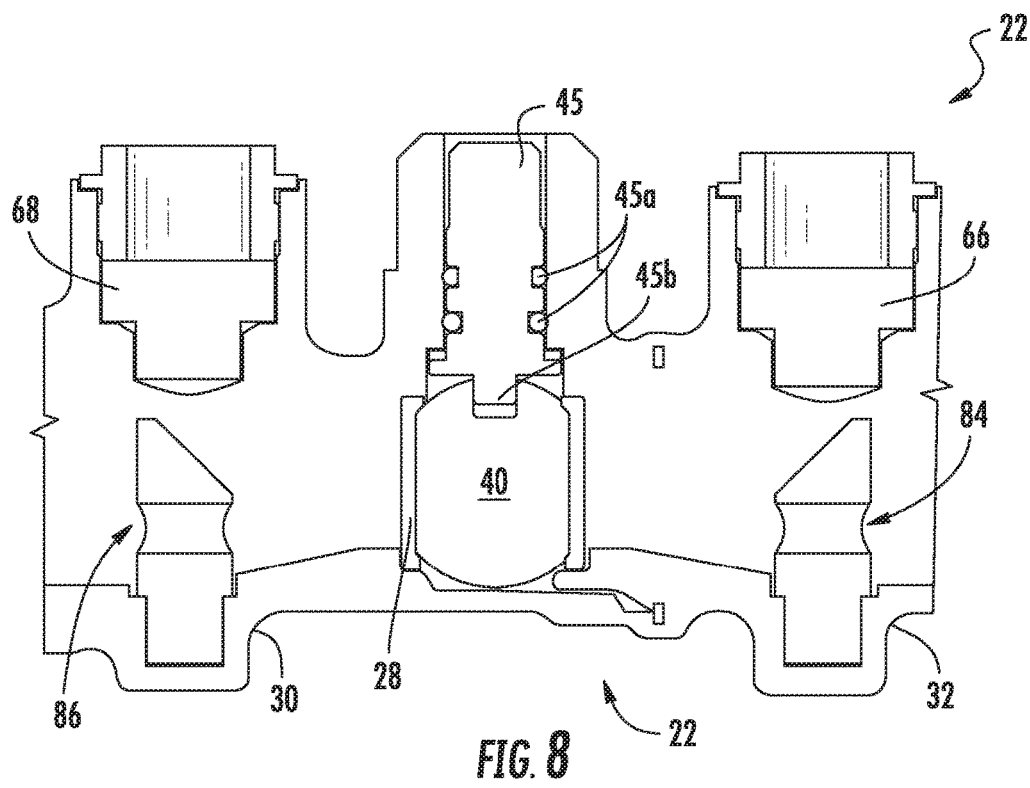
FIG. 8 is a sectional view of the fluid-flow measuring ball valve similar to FIG. 3 and showing the spindle as part of the actuator in accordance with a non-limiting example.
Figure 9:
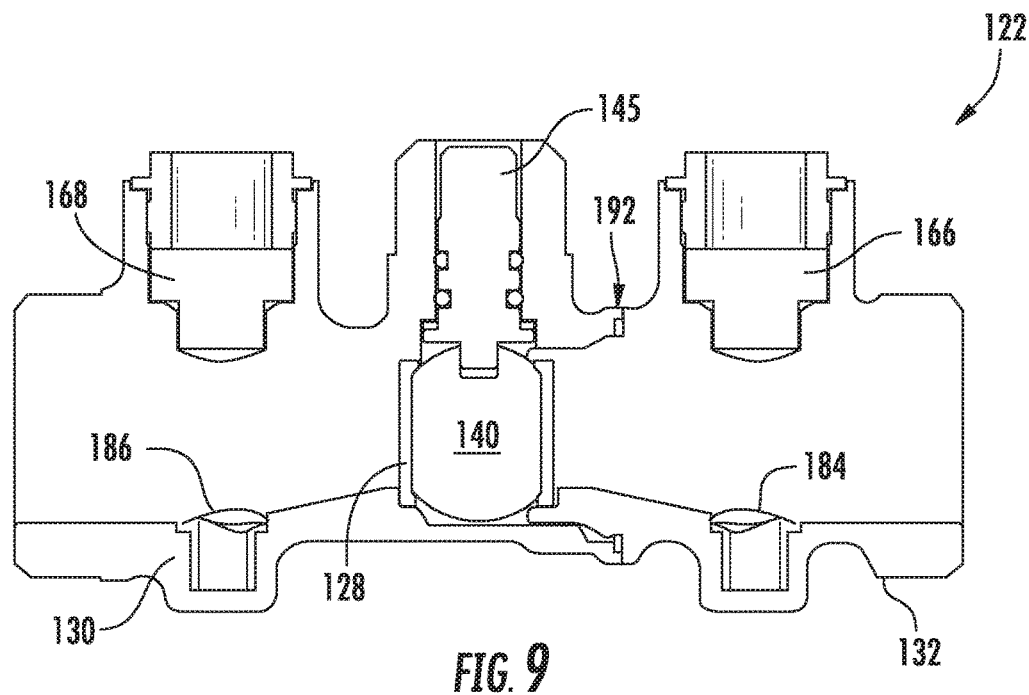
FIG. 9 is a sectional view of the fluid-flow measuring ball valve that includes a body and end adapter similar to that shown in FIGS. 5 and 6, but using an actuator with the spindle in accordance with a non-limiting example.
Figure 10:
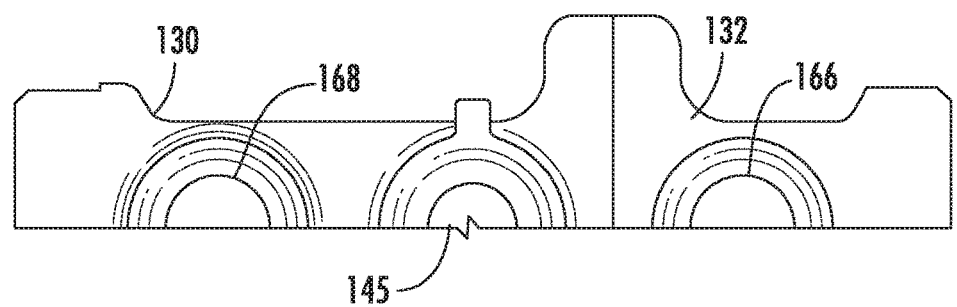
FIG. 10 is a partial, top plan view of the fluid-flow measuring ball valve shown in FIG. 9.
Figure 11:
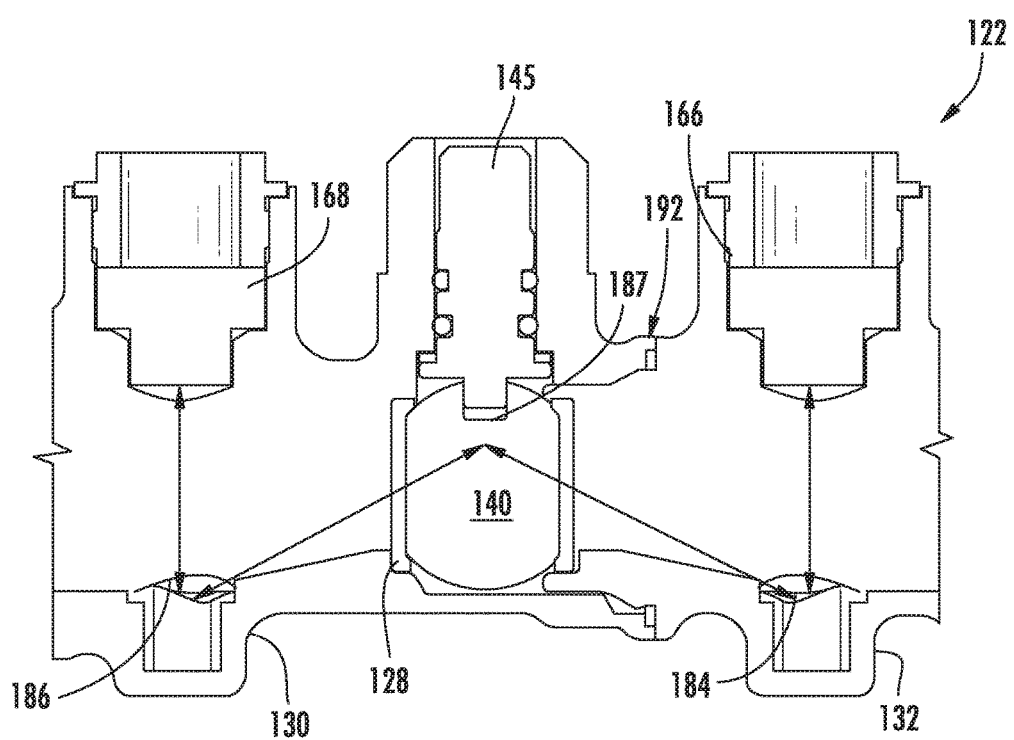
FIG. 11 is a sectional view of the fluid-flow measuring ball valve of FIG. 9 showing the first and second acoustic reflectors as machined surfaces in accordance with a non-limiting example.
Figure 12:
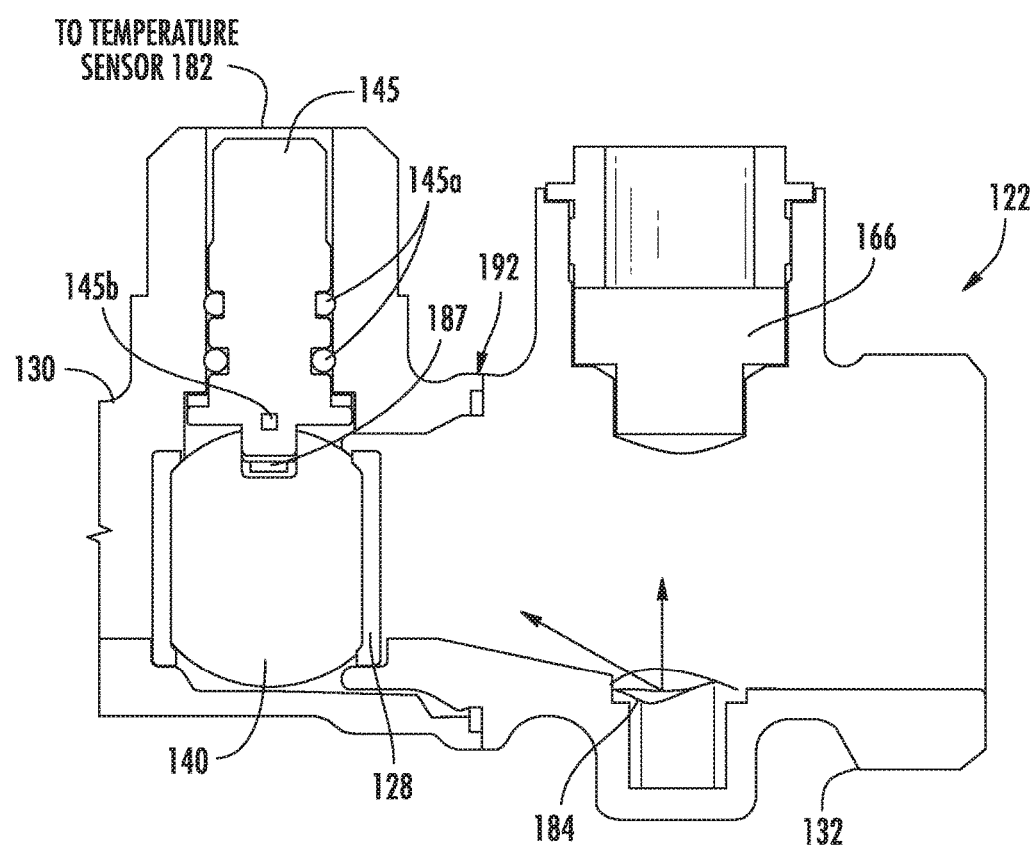
FIG. 12 is a fragmentary, enlarged sectional view of a portion of the fluid-flow measuring ball valve shown in FIG. 11 showing greater details of the acoustic reflector.

FIG. 8 shows the spindle 45 received within the housing 22. FIGS. 9 and 10 are other sectional views showing the spindle 145 received within the valve body 130 in an embodiment that includes the machined acoustic reflector surfaces 184, 186 as better shown in FIGS. 11 and 12. The machined acoustic reflector surfaces 184, 186 are calibrated and positioned such as at a 30% or 45% or other angle to ensure that the "ping" from the transducers bounces correctly. In this embodiment, the first and second acoustic reflector surfaces 184, 186, are machined in the body outside the ball area, and the third acoustic reflector surface 187 may be machined at the end of the spindle in an example or in the orifice inner wall.

Figure 13:
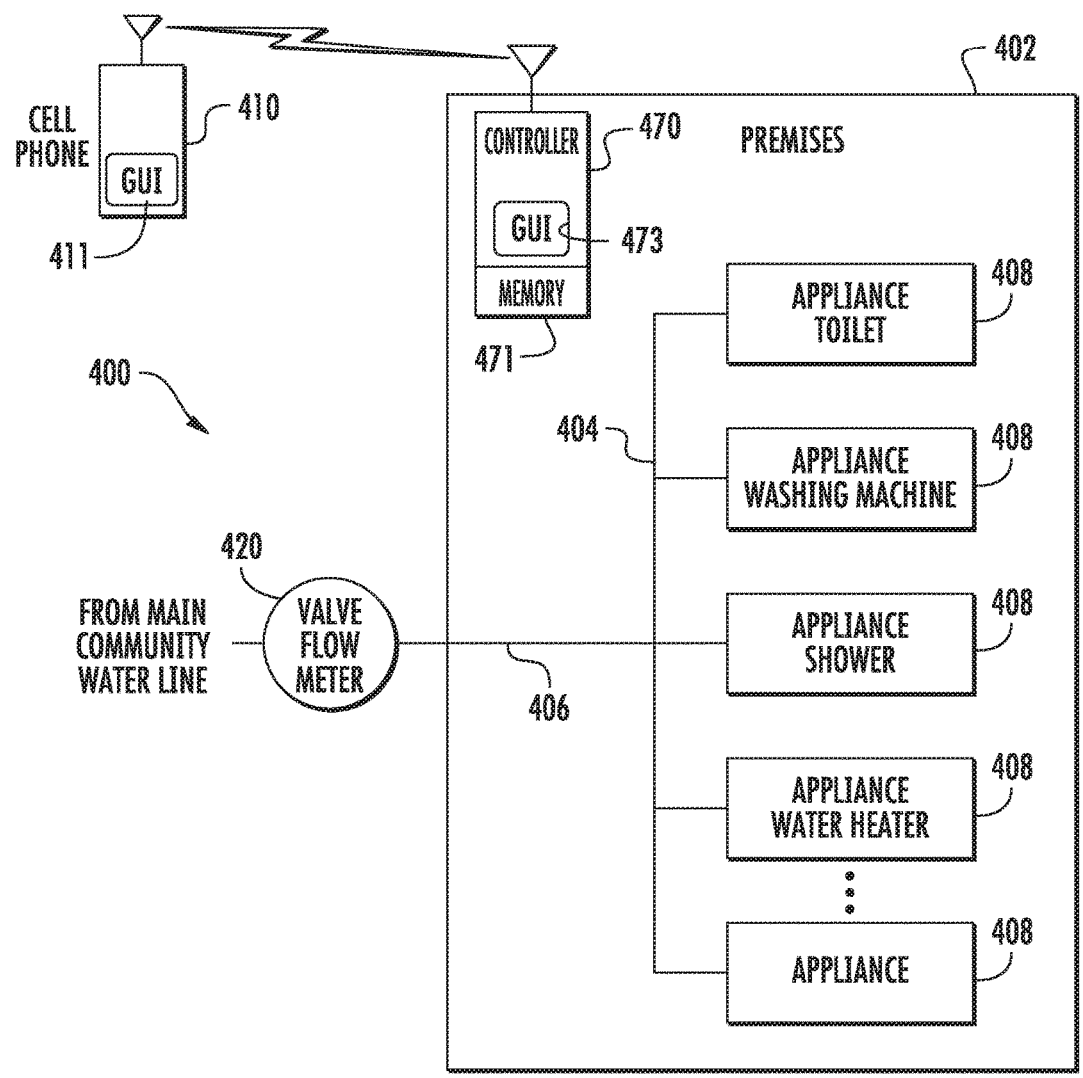
FIG. 13 is a fragmentary environmental view of a premises such as a residence showing a water flow control system that incorporates the fluid-flow measuring ball valve in accordance with a non-limiting example.

FIG. 13 shows a high-level diagram of a water flow control system 400 (numbers begin in the 400 series) for a premises such as a residence 402 where the premises include a water system 404 that includes the ball valve 420 as described above having a water main 406 and a plurality of appliances 408 connected into the water system such as a washing machine, toilets, showers, water heater, and other water using appliances. The controller 470 may include a memory 471 having a water usage signature configured for each appliance 408 to which the fluid-flow measuring ball valve 420 is attached and configured to measure the consumption of water inside the premises. In this example, a graphical user interface 473 is connected to the controller 470 and displays status and permits input of data for the water system. It also includes specific signatures of appliances. The system 400 could connect to a portable communications device 410 such as a mobile phone. A GUI 411 could be located on the phone to display status or input data.

For example, the ball valve with integrated flowmeter 420 will be able to measure the consumption of water inside the apartment, house or residences from one single point. With a specific algorithm that can be tailored for specific premises, the configuration and consumption of water (or gas, if used as a gas ball valve and flowmeter) is registered as a "signature" for each specific appliance and the system will be able to register and classify the consumption of water and gas inside the premises. The controller 470 could be selflearning with real-time water/gas usage divided for each appliance or plumbing fixture. This system in effect has allowed a water balance and water footprint. Thus greater control over consumption can be arranged and appliances adjusted accordingly.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A fluid-flow measuring ball valve, comprising:
a housing having inlet and outlet openings and a valve chamber;
a ball contained within the valve chamber, said ball having an orifice;
an actuator supported by said housing and connected to said ball for turning the ball within said housing between an open position allowing fluid flow through the orifice and a closed position preventing fluid flow;
a first ultrasonic transducer positioned in said housing upstream of said ball;
a second ultrasonic transducer positioned in said housing downstream of said ball;
first and second acoustic reflectors positioned within the housing;
a controller connected to said first and second ultrasonic transducers; and
wherein said first and second ultrasonic transducers and first and second acoustic reflectors are aligned to transmit and reflect ultrasonic signals in at least one direction through the orifice of the ball when the ball is in an open position and said controller is configured to determine the fluid velocity based on measured speed of sound and calculate the volume of fluid passing through the orifice based on the measured fluid velocity and cross-sectional area of the orifice.

2. The fluid-flow measuring ball valve according to claim 1 wherein said actuator includes a spindle connected to said ball valve and a temperature sensor carried by said spindle and connected to said controller and configured to measure the fluid temperature.

3. The fluid-flow measuring ball valve according to claim 1 wherein said first and second acoustic reflectors comprise an upstream and downstream vertical support mounted within the housing having an acoustic reflector surface configured to reflect acoustic signals either into an acoustic transducer or into an acoustic reflector surface depending on the transmitted direction of the ultrasonic signals.

4. The fluid-flow measuring ball valve according to claim 1 wherein said first and second acoustic reflectors each comprise a machined surface integrated within an inner surface of the housing that is calibrated to reflect ultrasonic signals into an acoustic transducer or an acoustic reflector surface depending on the transmitted direction of the ultrasonic signals.

5. The fluid-flow measuring ball valve according to claim 4 further comprising a third acoustic reflector surface that is calibrated with first and second acoustic reflector surfaces to reflect ultrasonic signals and provide multiple reflections.

6. The fluid-flow measuring ball valve according to claim 1 wherein said first and second ultrasonic transducers each comprises transmitter and receiver circuits configured to transmit and receive ultrasonic signals and said controller is configured to determine fluid velocity based on time-of-flight or the Doppler effect.

7. The fluid-flow measuring ball valve according to claim 1 wherein said actuator comprises a drive mechanism and said controller is integrated within said actuator and connected to said drive mechanism and configured to actuate the drive mechanism to turn said ball among an open, closed or intermediate position.

8. The fluid-flow measuring ball valve according to claim 1 wherein said controller includes a memory having a water usage signature configured for each appliance in a premises having a water system to which the fluid-flow measuring ball valve is attached and configured to measure the consumption of water inside the premises.

9. A fluid-flow measuring ball valve, comprising:
a housing comprising a valve body and an end adapter connected together and configured to form an inlet opening and an outlet opening and a valve chamber;
a replaceable ball contained within the valve chamber, said ball having an orifice;
an actuator supported by said valve body and connected to said ball for turning the ball within said housing between an open position allowing fluid flow through the orifice and a closed position preventing fluid flow;
a first ultrasonic transducer positioned in said housing upstream of said ball;
a second ultrasonic transducer positioned in said housing downstream of said ball;
first and second acoustic reflectors positioned within the housing;
a controller connected to said first and second ultrasonic transducers; and
wherein said first and second ultrasonic transducers and first and second acoustic reflectors are aligned to transmit and receive ultrasonic signals in at least one direction through the orifice of the ball when the ball is in an open position and said controller is configured to determine the fluid velocity based on measured speed of sound and calculate the volume of fluid passing through the orifice based on the measured fluid velocity and cross-sectional area of the orifice.

10. The fluid-flow measuring ball valve according to claim 9 wherein said body and end adapter each include flanges and through holes that align the first and second ultrasonic transducers and first and second acoustic reflectors.

11. The fluid-flow measuring ball valve according to claim 9 wherein said body and end adapter each include gauged threads for assembling the end adapter onto the body and alignment marks on the body and end adapter that when aligned indicate the ultrasonic transducers and acoustic reflectors are aligned.

12. The fluid-flow measuring ball valve according to claim 9 wherein said actuator includes a spindle connected to said ball valve and a temperature sensor carried by said spindle and connected to said controller and configured to measure the fluid temperature.

13. The fluid-flow measuring ball valve according to claim 9 wherein said first and second acoustic reflectors comprise an upstream and downstream vertical support mounted within the housing and having an acoustic reflector surface configured to reflect acoustic signals either into an acoustic transducer or into an acoustic reflector surface depending on the transmitted direction of the ultrasonic signals.

14. The fluid-flow measuring ball valve according to claim 9 wherein said first and second acoustic reflectors each comprises a machined surface integrated within an inner surface of the housing that is calibrated to reflect ultrasonic signals into an acoustic transducer or an acoustic reflector depending on the transmitted direction of the ultrasonic signals.

15. The fluid-flow measuring ball valve according to claim 14 further comprising a third acoustic reflector surface that is calibrated with first and second acoustic reflector surfaces to reflect ultrasonic signals and provide multiple reflections.

16. The fluid-flow measuring ball valve according to claim 9 wherein said first and second ultrasonic transducers each comprises transmitter and receiver circuits configured to transmit and receive ultrasonic signals and said controller is configured to determine fluid velocity based on time-of-flight or the Doppler effect.

17. The fluid-flow measuring ball valve according to claim 9 wherein said actuator comprises a drive mechanism and said controller is integrated within said actuator and connected to said drive mechanism and configured to actuate the drive mechanism to turn said ball among an open, closed and an intermediate position.

18. The fluid-flow measuring ball valve according to claim 9 wherein said controller includes a memory having a water usage signature configured for each appliance in a premises having a water system to which the fluid-flow measuring ball valve is attached and configured to measure the consumption of water inside the premises.

19. A fluid-flow measuring ball valve, comprising:
a housing comprising a body and an end adapter connected together and configured to form an inlet opening and an outlet opening and a valve chamber;
a ball contained within the valve chamber, said ball having an orifice;
an actuator supported by said housing and connected to said ball for turning the ball within said housing between an open position allowing fluid flow through the orifice and a closed position preventing fluid flow;
a first ultrasonic transducer positioned in said housing upstream of said ball;
a second ultrasonic transducer positioned in said housing downstream of said ball;
a controller connected to said first and second ultrasonic transducers; and
wherein said first and second ultrasonic transducers are aligned to transmit and reflect ultrasonic signals in at least one direction through the orifice of the ball when the ball is in an open position and said controller is configured to determine the fluid velocity based on measured speed of sound and calculate the volume of fluid passing through the orifice based on the measured fluid velocity and cross-sectional area of the orifice, wherein said body and end adapter each include gauged threads for assembling the end adapter onto the body and alignment markers on the body and end adapter that when aligned indicate the first and second ultrasonic transducers are aligned.

20. The fluid-flow measuring ball valve according to claim 19 wherein said actuator includes a spindle connected to said ball valve and a temperature sensor carried by said spindle and connected to said controller and configured to measure the fluid temperature.

21. The fluid-flow measuring ball valve according to claim 19 wherein said first and second ultrasonic transducers each comprises transmitter and receiver circuits configured to transmit and receive ultrasonic signals and said controller is configured to determine fluid velocity based on time-of-flight or Doppler effect.

22. The fluid-flow measuring ball valve according to claim 19 further comprising first and second acoustic reflectors, wherein said first and second acoustic reflectors comprise an upstream and downstream vertical support mounted within the housing having an acoustic reflector surface configured to reflect acoustic signals either into an acoustic transducer or into an acoustic reflector surface depending on the transmitted direction of the ultrasonic signals.

23. The fluid-flow measuring ball valve according to claim 19 further comprising first and second acoustic reflectors, wherein said first and second acoustic reflectors each comprise a machined surface integrated within an inner surface of the housing that is calibrated to reflect ultrasonic signals into an acoustic transducer or an acoustic reflector depending on the transmitted direction of the ultrasonic signals.

24. The fluid-flow measuring ball valve according to claim 23 further comprising a third acoustic reflector surface that is calibrated with first and second acoustic reflector surfaces to reflect ultrasonic signals and provide multiple reflections.

25. A water flow control system for a premises, said premises including a water system and a plurality of appliances connected into the water system;
a fluid-flow measuring ball valve connected into the water system, said fluid-flow measuring ball valve comprising:
a housing having inlet and outlet openings and a valve chamber;
a ball contained within the valve chamber, said ball having an orifice;
an actuator supported by said housing and connected to said ball for turning the ball within said housing between an open position allowing fluid flow through the orifice and a closed position preventing fluid flow;
a first ultrasonic transducer positioned in said housing upstream of said ball;
a second ultrasonic transducer positioned in said housing downstream of said ball; and
a controller connected to said first and second ultrasonic transducers, wherein said first and second ultrasonic transducers are aligned to transmit and receive ultrasonic signals in at least one direction through the orifice of the ball when the ball is in an open position and said controller is configured to determine the fluid velocity based on measured speed of sound and calculate the volume of fluid passing through the orifice based on the measured fluid velocity and cross-sectional area of the orifice, said controller comprising a memory having a water usage signature configured for each appliance in the premises and configured to measure the consumption of water inside the premises, and a graphical user interface connected to said controller for displaying status and inputting data of the water system and specific signatures of appliances.

26. The water flow control system according to claim 25 wherein said actuator includes a spindle connected to said ball valve and a temperature sensor carried by said spindle and connected to said controller and configured to measure the fluid temperature.

27. The water flow control system according to claim 25 wherein said first and second acoustic transducers each comprise transmitter and receiver circuits configured to transmit and receive ultrasonic signals, and said controller is configured to determine velocity based on time-of-flight or Doppler effect.

28. The water flow control system according to claim 25 further comprising first and second acoustic reflectors, wherein said first and second acoustic reflectors comprise an upstream and downstream vertical support mounted within the housing having an acoustic reflector surface configured to reflect acoustic signals either into an acoustic transducer or into an acoustic reflector surface depending on the transmitted direction of the ultrasonic signals.

29. The water flow control system according to claim 25 further comprising first and second acoustic reflectors, wherein said first and second acoustic reflectors each comprise a machined surface integrated within an inner surface of the housing that is calibrated to reflect ultrasonic signals into an acoustic transducer or an acoustic reflector depending on the transmitted direction of the ultrasonic signals.

30. The water flow control system according to claim 29 further comprising a third acoustic reflector surface that is calibrated with first and second acoustic reflector surfaces to reflect ultrasonic signals and provide multiple reflections.

\* \* \* \* \*